United States Patent
Tran et al.

(10) Patent No.: US 12,489,787 B1
(45) Date of Patent: Dec. 2, 2025

(54) EMAIL BOT CLICK DETECTION

(71) Applicant: SAP SE, Walldorf (DE)

(72) Inventors: Joel Bao-Lan Tran, Canton de Hatley (CA); Isabelle Thore, Montreal (CA); Nirmal Pothuraj, Saint-Philippe (CA); Marc Dorais, Laval (CA); Mihai David, La Prairie (CA); Mackenzie Trenholm, Montreal (CA); Ali Mahram Hassan Zada, Mirabel (CA); Bianca Matei, Brossard (CA); Martin Parent, St-Joseph-du-Lac (CA); Fuman Jin, Montreal (CA)

(73) Assignee: SAP SE, Walldorf (DE)

( * ) Notice: Subject to any disclaimer, the term of this patent is extended or adjusted under 35 U.S.C. 154(b) by 39 days.

(21) Appl. No.: 18/766,362

(22) Filed: Jul. 8, 2024

(51) Int. Cl.
*H04L 9/40* (2022.01)
*G06F 11/34* (2006.01)
*H04L 51/07* (2022.01)

(52) U.S. Cl.
CPC ...... *H04L 63/1491* (2013.01); *G06F 11/3438* (2013.01); *H04L 51/07* (2022.05); *H04L 2463/144* (2013.01)

(58) Field of Classification Search
CPC ... H04L 63/1491; H04L 51/07; H04L 67/535; H04L 43/10; H04L 2463/144; G06F 11/3438
See application file for complete search history.

(56) References Cited

U.S. PATENT DOCUMENTS

| | | | | |
|---|---|---|---|---|
| 8,943,594 | B1 * | 1/2015 | Arrowood | H04L 63/1491 726/23 |
| 2013/0061307 | A1 * | 3/2013 | Livne | G06F 21/44 726/7 |
| 2013/0117081 | A1 * | 5/2013 | Wilkins | G06Q 30/0248 705/14.4 |
| 2017/0345003 | A1 * | 11/2017 | Spears | H04L 63/102 |
| 2020/0387819 | A1 * | 12/2020 | Rogynskyy | G06N 20/00 |
| 2021/0314269 | A1 * | 10/2021 | Stewart | H04L 63/1425 |

(Continued)

OTHER PUBLICATIONS

"MailSoar", [Online] Retrieved from the internet: https: www.mailsoar.com bots-clicking , (Aug. 12, 2021), 8 pgs.

(Continued)

*Primary Examiner* — Kostas J Katsikis
(74) *Attorney, Agent, or Firm* — SCHWEGMAN LUNDBERG & WOESSNER, P.A.

(57) ABSTRACT

In an example embodiment, a mechanism is provided that helps distinguish between email link clicks that are initiated by a human and those that are initiated by a bot. The mechanism provides three different processes for such detection, as well as processes for how to deal with clicks that are initiated by a bot, although it is not necessary to employ all three. These different processes include detection of high volumes of clicks from a particular address range in a short period of time, a hidden honey pot, and detection of duplicate clicks from different addresses. In additional example embodiments, a stall time is added to any evaluation of click metric to allow time for the aforementioned processes to detect and handle bot clicks. This stall time effectively keeps any clicks from "counting" until the bot detection mechanism(s) can perform their tasks.

20 Claims, 7 Drawing Sheets

(56) References Cited

U.S. PATENT DOCUMENTS

2022/0131895 A1* 4/2022 Ho .................. G06Q 30/0222
2024/0152605 A1* 5/2024 Chen ................ G06Q 30/0246

OTHER PUBLICATIONS

"Swiss cheese model", [Online] Retrieved from the internet: https: en.wikipedia.org wiki Swiss_cheese_model, (accessed on Apr. 24, 2024), 4 pgs.

Grekova, Anna, "How to Detect Bots in Email Marketing Campaigns: GTCbio Case Study", Yespo [Online] Retrieved from the internet: https: esputnik.com en blog how-to-detect-bots-case-study, (Dec. 24, 2019), 9 pgs.

Hill, Josh, "5-Step Solution for False Click Links in Email", Marketing Rockstar Guides [Online] Retrieved from the internet: https: www.marketingrockstarguides.com spam-bot-fake-clicks-in-email-3467 , (Aug. 14, 2018), 9 pgs.

* cited by examiner

EMAIL BOT CLICK DETECTION

TECHNICAL FIELD

This document generally relates to issues involving computer communications. More specifically, this document relates to email bot click detection.

BACKGROUND

Providing security in computer systems and networks can be quite challenging. Email communications specifically can often contain viruses or other malicious aspects that can affect the security and privacy of users, computers, and data. In order to combat this, oftentimes emails are automatically scanned for viruses or other malicious aspects. The applications or processes that perform these scans are often called "email bots." Email bots can be used at different times for the same email communication. For example, a bot may be designed to scan all incoming emails as they are received, prior to being presented to the user. Alternatively, or in conjunction with this, another bot may be designed to perform actions in response to a user selection or action upon the email, such as automatically scanning a website referenced in a link when the user hovers or clicks on a link embedded in an email.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
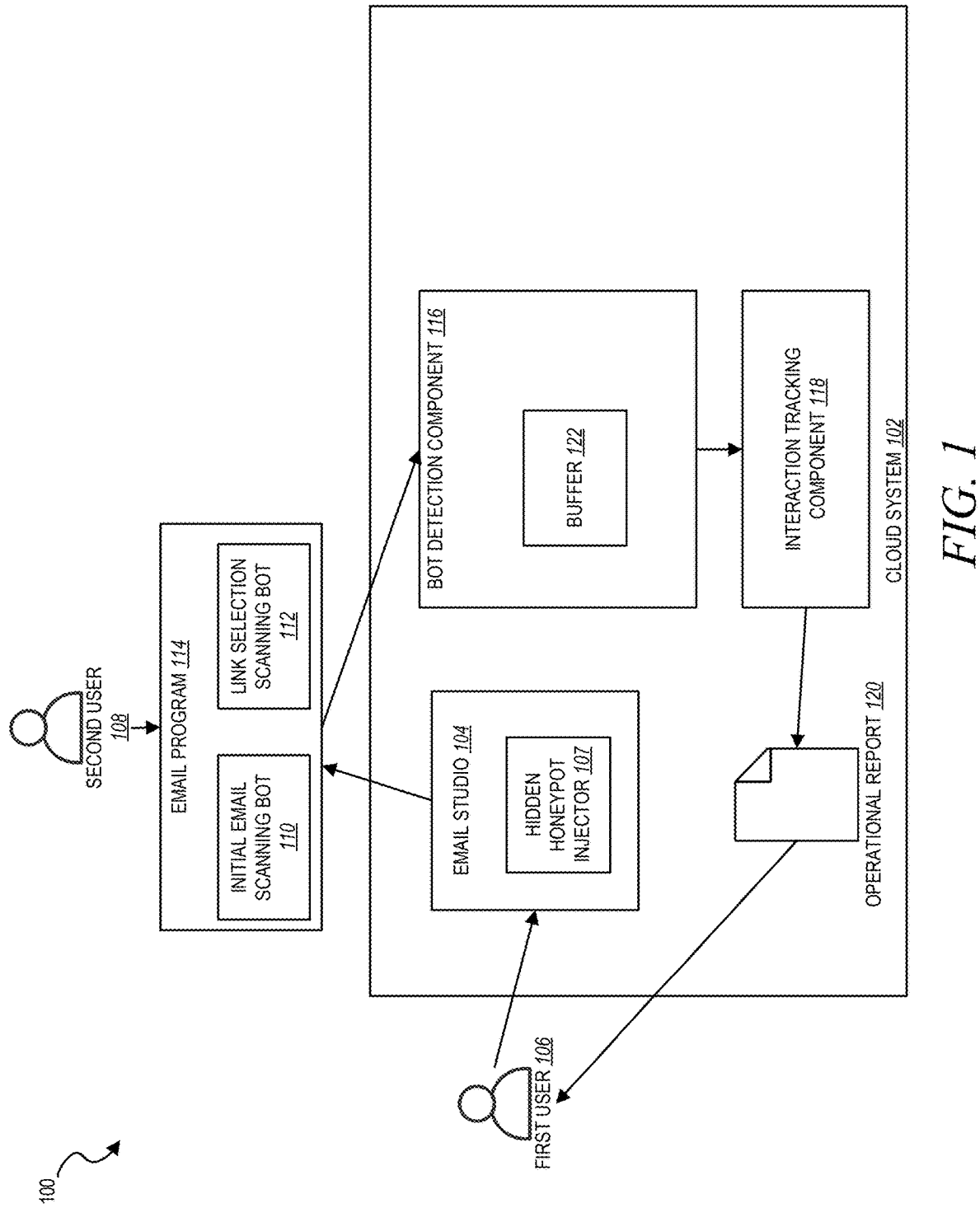
FIG. 1 is a block diagram illustrating a system for detecting whether an embedded link click was initiated by a bot or a user, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

There are various technical issues that arise with the use of email bots to scan portions of emails. Specifically, one common action performed by email bots is to automatically scan any links embedded in the email. A link is a uniform resource locator (URL) that, when selected by a user, causes a web page associated with the URL to be opened in a web browser or other application. Links embedded in emails can be used by nefarious actors in various ways. In one example, an embedded link may direct the user to a location where a virus is automatically downloaded. In another example, an embedded link may direct the user to a location that is somewhere other than where the user thought, typically in an attempt to trick the user into providing personal details (a practice known as phishing).

In order to combat these types of nefarious uses of embedded links, email bots often will follow the link and test out what actions occur, prior to the website associated with the link being presented to the user. As mentioned earlier, this may occur either when the email is first received by the email application, or when the user has performed some action (such as selecting the link).

Technical issues, however, are introduced when legitimate email content providers send emails with links that are scanned by the email bots. Specifically, these legitimate email content providers often use various measurements of interactions with their content (called metrics) to evaluate the performance of their emails. For example, a legitimate email content provider that wishes to offer recipients a discount on products for users who click on a particular embedded link in an email may measure the performance of this campaign based on how many clicks were received on the embedded link. Each time the link is selected, a click metric is increased. The technical issues are that these metrics can be incorrect or otherwise inaccurate due to the use of email bots. Specifically, the click metric is increased each time either an email bot or a user follows a link. This can dramatically inflate the click metric of a campaign, since rather than a single click being received for a particular user, multiple clicks may be received, some from the one or more email bots following the link to protect the user and the last from the user itself. Additionally, with respect to email bots that scan all links regardless of whether the user actually clicks on a link, not only can a user's click count be inaccurately inflated, there can be cases where a user who was uninterested in the link can inaccurately be labeled as having been interested since the email bot followed the link and caused a click to be counted, even though the user never winds up actually clicking on the link. Thus, the technical problems encountered are both inflated click counts and false positives.

Additionally, while these problems are significant in Business-to-Consumer (B2C) environments, they are even more significant in Business-to-Business (B2B) environments. The reach of emails in the B2B world is smaller than in the B2C world, and thus even minor inaccuracies in click metrics can give wildly different results. B2B environments also build business relationships that can be damaged by unwanted follow-up communications (such as from false positives).

In an example embodiment, a mechanism is provided that helps distinguish between email link clicks that are initiated by a human and those that are initiated by a bot. The mechanism provides several different processes for such detection, as well as processes for how to deal with clicks that are initiated by a bot, although it is not necessary to employ all three. These different processes include detection of high volumes of clicks from a particular address range in a short period of time, a hidden honey pot, and detection of duplicate clicks from different addresses. In additional example embodiments, a stall time is added to any evaluation of click metric to allow time for the aforementioned processes to detect and handle bot clicks. This stall time effectively keeps any clicks from "counting" until the bot detection mechanism(s) can perform their tasks.

FIG. 1 is a block diagram illustrating a system 100 for detecting whether an embedded link click was initiated by a bot or a user, in accordance with an example embodiment. It should be noted that the term "click" as used herein shall be interpreted broadly to include any action taken to select a link to cause the address indicated by the link to be visited by an application. This may include, but is not necessarily limited to, actions taken by a user to select a link, such as a literal click involving hovering a cursor over the link and pressing a mouse or other input device to cause selection of the link, non-literal clicks by a user, such as the user performing some other input device action to cause selection of the link, or automatic selection and following of the link by a bot or similar program.

A cloud system 102 may include an email studio 104, which is an application that a first user 106, such as a marketer, can use to create content for an email. This content may be, for example, in the form of a web content that is embedded in the body of the email, such as a web page written in HyperText Markup Language (HTML).

Included in the email studio 104 is a hidden honeypot injector 107, which acts to insert one or more hidden honeypots into the email. For purposes of this disclosure, a hidden honeypot is a link to a fictitious web page that is inserted into the email in such a way that it is hidden from a user, such as second user 108, who eventually views the email. The purpose of inserting this hidden honeypot is that a bot, such as an initial email scanning bot 110 or a link selection scanning bot 112 inside an email program 114, will act to navigate to the hidden honeypot address since it will assume it is a link like other embedded links in the email, but a human user, such as the second user 108, will never navigate to the hidden honeypot address since it is not visible to the user. In that way, bot detection component 116 is able to differentiate between a click of a human user and a click of a bot on one of the other embedded links in the email, by determining that a click that is from the same source address as a navigation action to one of the hidden honeypot(s) will have also come from a bot.

There are a variety of different ways that a hidden honeypot can be inserted into an email. The first is to use a header of the email, and specifically a field in the header that is not being used for another purpose in the email. An example would be a "List-Unsubscribe" email header field. This field allows email senders to have an unsubscribe link displayed prominently to viewers rather than the traditional unsubscribe link provided near the bottom of the email. This field, however, is rarely used and yet a link contained in this field is not visible to the user and also is scanned by email bots, making it potentially usable for the embedding of a hidden honeypot.

The second way to insert a hidden honeypot into an email is to design a link element that has a visible size of zero, thus making it not rendered on the viewer-side. This can be accomplished, for example, by inserting the link in a table of size zero.

The third way to insert a hidden honeypot into an email is to design a link element that is rendered, but is otherwise not visible to the viewer, such as a link that is rendered in the same color as a background color or a link that is rendered behind another user interface element.

In all these cases, the hidden honeypot is a link that is not visible to the viewer and yet is followed by an email bot.

As mentioned before, there are at least two types of email bots, an initial scanning bot 110 and a link selection scanning bot 112. Both act to "click" on links embedded in an email and follow the corresponding addresses to perform one or more scanning functions on the content retrieved from the addresses, but do so at different times and in response to different circumstances. The initial scanning bot 110 attempts to scan emails as they are received by the email program 114 (and before they are viewed by the viewer, such as the second user 108). The link selection scanning bot 112 only scans links that are actually clicked on by a viewer (obviously after the user has seen the links but before the user is presented with any content from following the link). The hidden honeypot solution described above thus only aids in detection of an initial scanning bot 110, because any link that is invisible to a viewer will wind up never getting clicked on by a link selection scanning bot 112, since the link selection scanning bot 112 is only invoked upon the viewer clicking the link.

The actual bot detection is performed in the bot detection component 116. The bot detection component 116 may be, for example, provided with a list of honeypot addresses that are potentially used by the hidden honeypot injector 107. The bot detection component 116 then detects when a click is made upon a link containing one of the addresses in the list. It then labels that click, as well as any past or future clicks from the same source address, as being "bot click." In this way it is not necessary that the honeypot link be the first click in a sequence. It could be anywhere in the sequence, and once it is detected somewhere in a sequence then the entire sequence can be considered as bot clocks.

A bot click label is intended to convey that the click was from a bot rather than a human. Such labels may be attached to the click information (e.g., information about the source and time of the click) and passed to an interaction tracking component 118, which notes the label when preparing, for example, an operational report 120 to be presented to the first user 106. Bot interactions may be labeled with a label such as "bot click" while human interactions may be labeled with a label such as "click through," although these precise labels are not necessary.

Labeling past clicks as being bots is made possible through the use of a stall time. This specifically means that a mechanism is provided to delay the sending of the click information from the bot detection component 116 to the interaction tracking component 118 to allow the bot detection component 116 to detect bot-related patterns in clicks that occur over time. One such mechanism would be a buffer 122 in which click information is stored until the bot detection component 116 is able to process it or for some threshold period of time that exceeds the amount of time between clicks that would be indicative of some sort of relationship between the clicks.

It should also be noted that a mechanism can be provided to revert a bot click label to a click through label if it is later determined that a suspected bot click label was due to a misclassification (if the click through label would be more appropriate).

In addition to a hidden honeypot, there is another mechanism that can be used to detect whether a click is from an initial scanning bot 110 or a human user. This mechanism may be called the source address range mechanism. This mechanism follows a process where it detects if there are multiple clicks on the same link from similar source addresses. Here, similar source addresses may be defined as source addresses that are within the same address range (such as Internet Protocol (IP) address range). More specifically, the source address range mechanism is looking for a high number of clicks on a particular range from the same address range, within a certain threshold period of time. Here, high number of clicks may be defined by a click number threshold, which may be a statically or dynamically set value. If the number of clicks on a link from the particular source address range during the threshold period of time exceeds the click number threshold, then all clicks from source addresses in that source address range, (including past, present, and future clicks) may be labeled as bot clicks.

There are multiple different techniques described above for detecting whether a click is from a bot or a human. In some example embodiments, these multiple different techniques may all be used and, if any of the techniques indicate that the click is from a bot, then it is determined that the click is from a bot (one violation of any of the tests is enough).

Figure 2:
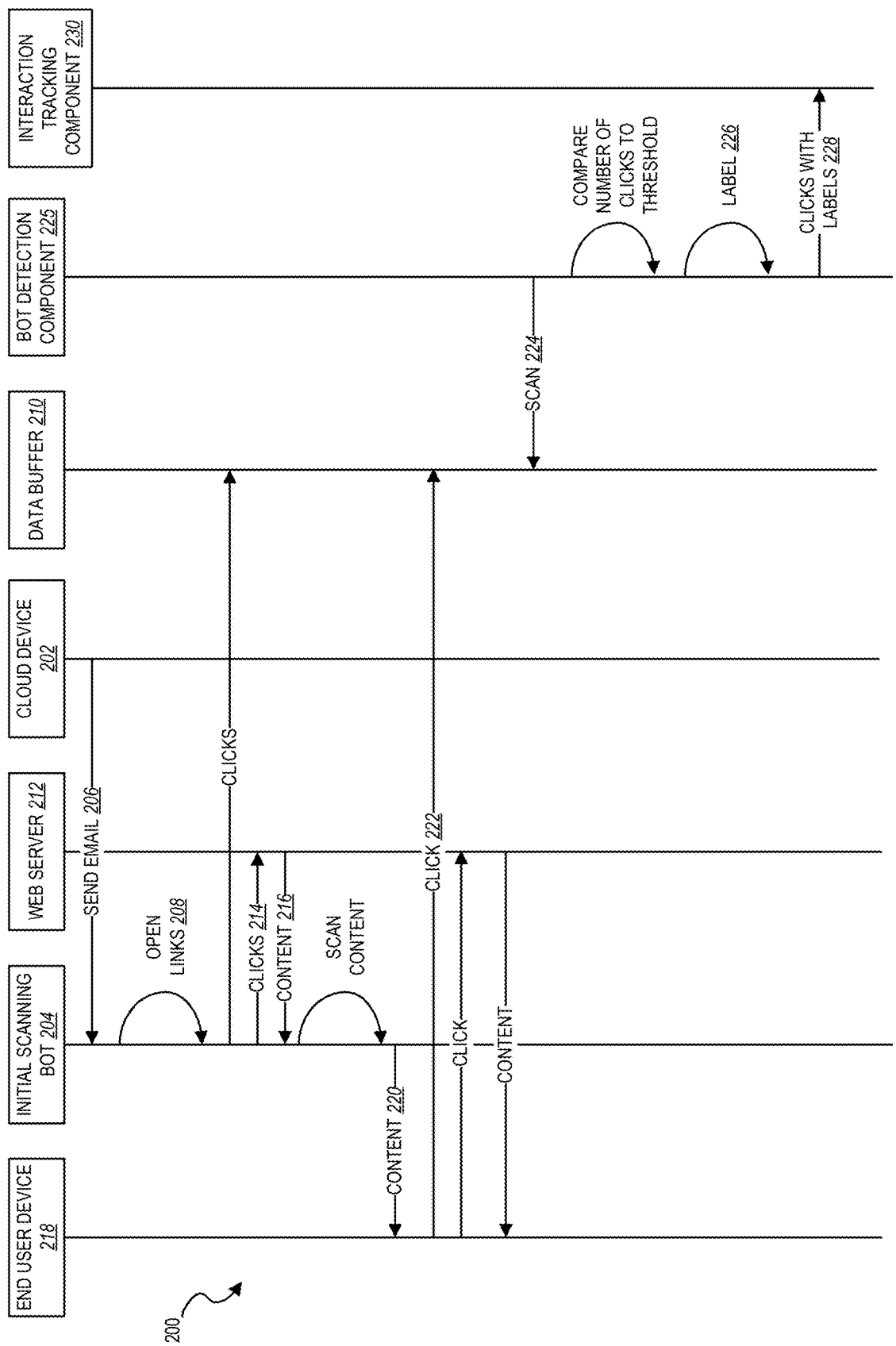
FIG. 2 is a ladder diagram illustrating a method of detecting whether a click is from an initial scanning bot or a human user, in accordance with an example embodiment.

FIG. 2 is a ladder diagram illustrating a method 200 of detecting whether a click is from an initial scanning bot or a human user, in accordance with an example embodiment. Here, an email is sent from a cloud device 202 to an initial scanning bot 204 at operation 206. The initial scanning bot 204 opens links in the email at operation 208, causing clicks to be registered in the data buffer 210. The clicks are sent to a web server 212 at operation 214, which returns content at operation 216. The content is then returned to the initial scanning bot 204, which scans the content to determine whether the corresponding link(s) is/are safe. Assuming the link(s) is/are safe, then the email is delivered to an end user device 218 at operation 220.

At operation 222, a user associated with the end user device 218 clicks on a link, which is registered in the data buffer 210. The click is also sent to the web server 212, which returns content to the end user device 218.

At operation 224, after a delay time, a bot detection component 225 scans the data buffer to identify a number of clicks that have occurred on the same link from within a preset source address range and compares it to a click number threshold. At this point, the data buffer 210 contains clicks registered from the initial scanning bot 204 as well as the click registered from the end user device 218. Assuming that the clicks from the initial scanning bot 204 occurred from addresses within the preset source address range, the initial scanning bot 204 determines if the number of clicks on the link from within the preset source address range exceeds the click number threshold. If they do, then at operation 226, all of the clicks from addresses within the preset source address range are labeled as bot clicks. At operation 228, all clicks in the data buffer are sent, with corresponding labels applied by the bot detection component 116, to an interaction tracking component 230.

As far as detecting whether a click is from a link selection scanning bot 112 or from a human user, another mechanism, called a link protection bot mechanism, may be used. The link protection bot mechanism acts to detect whether the click is from a link protection service, which is another name for a link selection scanning bot 112. Such a link protection service acts to wrap all embedded links in an email with a link protection wrapper that is used to validate the target URL when the user opens the link, to see if it is pointing to a malicious or phishing URL. A typical link may look like the following:

https://eur03.safelinks.protection.outlook.com/
?url=https%3A%2F%2Ft.mail.aircanada.com%2Fr
%2F%3Fid%3Dhd7d96842%2C1b120a3f%2C100e32
5f%26p1%3D266418221%26p2%3D454167103%26p3
%3D%409%2FbmnwEBKqW
m%2BUh6zGzYDQ%3D%3D&data=05%7C01%7Cj
oel.tran%40sap.com%7C8f82b41f03954a3b7d7f08daf
341e752%7C42f7676cf455423c82f6dc2d99791af7%7
C0%7C0%7C6380897616235869 23%7CUnknown%7
CTWFpbGZsb3d8eyJWIjoiMC4w
LjAwMDAiLCJQIjoiV2luMzIiLCJBTiI6Ik1haWwiL
CJXVCI6Mn0%3D%7C3000%7C%7C%7C&sdata=
OCnvoT1uf0jDI3hJIUOLnNF9rbsJl2hkEI3b0AlAvS
4%3D&reserved=0.

This link causes a redirect of the user's browser or other application such that rather than opening the actual address of the link directly, instead a separate link protection service is called using the actual address of the link as a parameter, and the parameter causes the link protection service to examine the actual address of the link. If it determines that content at the actual address of the link is safe (e.g., not containing malicious code or phishing attempts), then it tells the browser or other application to open the actual address of the link. Thus, even in cases where the link is legitimate, there are two clicks that occur for each user click on a link—the first coming from the link protection service and the second coming from the user.

As such, the link protection bot mechanism detects when two clicks occur within a short period of time on the same link but from different source addresses (e.g., different IP addresses). This short period of time may be defined as an amount of time less than a specified link protection threshold. This threshold may be static or dynamic.

If two clicks do occur within the short period of time on the same link but from different source addresses, then the bot detection component 116 labels the first click as being a bot click and the second click as being a click through.

Figure 3:
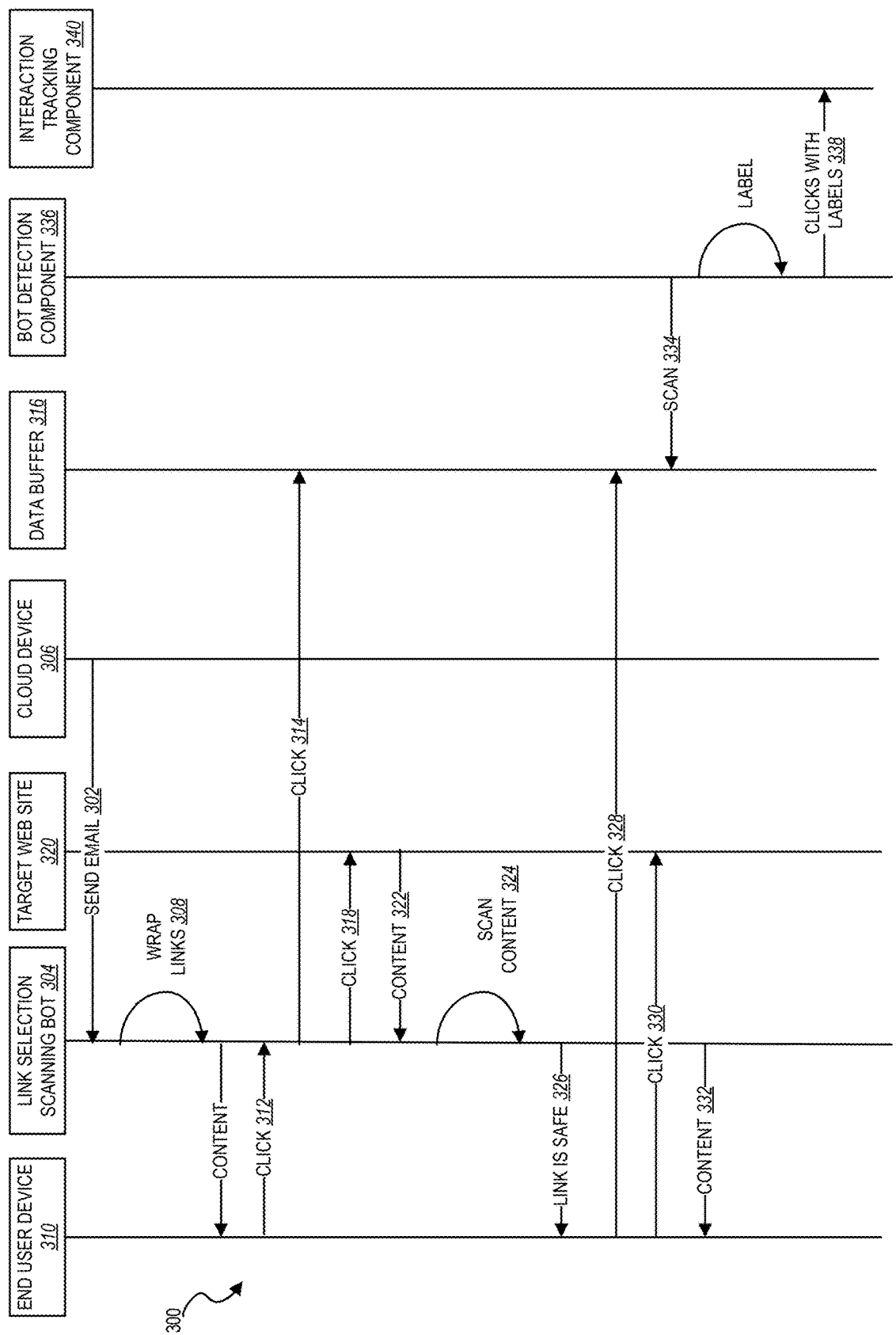
FIG. 3 is a ladder diagram illustrating a method of detecting whether a click is from a link selection scanning bot or a human user, in accordance with an example embodiment.

FIG. 3 is a ladder diagram illustrating a method 300 for of detecting whether a click is from a link selection scanning bot or a human user, in accordance with an example embodiment. At operation 302, a link selection scanning bot 304 receives an email from a cloud device 306. The email contains one or more links. At operation 308, the link selection scanning bot 304 wraps each of these links in a separate link protection wrapper. The link protection wrapper directs any click on the link back to the link selection scanning bot 304. The link selection scanning bot 304 then delivers the email, with the link protection-wrapped links, to an end user device 310. Thus, when at operation 312 the user associated with the end user device 310 clicks on a link protection-wrapped link, this click is redirected to the link selection scanning bot 304. The link selection scanning bot 304 then initiates a click on the link, which at operation 314 is logged in data buffer 316. At operation 318, the click on the link is sent to the target web site 320, which at operation 322 returns content. At operation 324, the link scanning selection bot 304 scans the content to determine whether the link is safe. Assuming it is, then at operation 326, then the link selection scanning bot 304 informs the end user device 310 that the link is safe, causing a click to be logged from the end user device 310 in the data buffer 316 at operation 328, and also causing the link to be followed at operation 330 to the target web site 320, which returns the content to the end user device 310 at operation 332.

At operation 334, after a delay time, a bot detection component 336 scans the data buffer 316 to identify a number of clicks that have occurred on the same link from within a preset source address range and compares it to a click number threshold. At this point, the data buffer 316 contains the click registered from the link selection scanning bot 304 as well as the click registered from the end user device 310. Assuming that the click from the link selection scanning bot 304 came from a different source address than the click from the end user device 310, the bot detection component 336 labels the click from the link selection scanning bot (the first of the pair) as being from a bot click, while the click from the end user device 310 (the second of the pair) is labeled as being a click through. Then at operation 338, all clicks in the data buffer are sent, with corresponding labels applied by the bot detection component 336, to an interaction tracking component 340.

Figure 4:
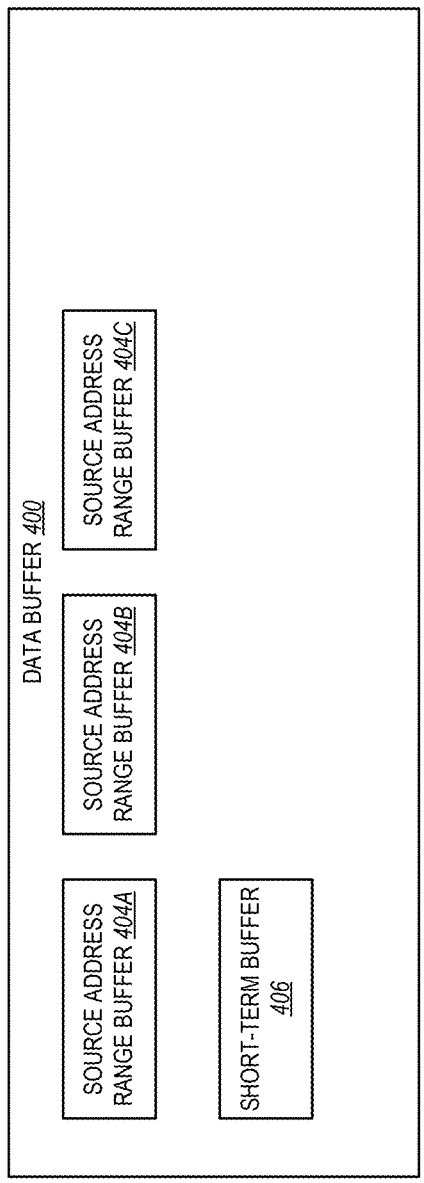
FIG. 4 is an example data buffer, in accordance with an example embodiment.

In some example embodiments, the data buffer, such as the data buffer 210 of FIG. 2 or the data buffer 316 of FIG. 3, may be broken into multiple smaller buffers, each meant for storing different clicks in different ways. FIG. 4 is an example data buffer 400, in accordance with an example embodiment. For ease of visualization, this figure only depicts buffers storing clicks on one particular link, but in reality there may be different versions of these buffers for each different link. Here, the data buffer 400 contains multiple source address range buffers 404A, 404B, 404C, each devoted to storing clicks from source addresses within different corresponding source address ranges. The data buffer 400 also contains a short-term buffer 406 devoted to storing clicks from different source addresses that occur within a short period of time (e.g., 2-3 seconds of one another). The multiple source address range buffers 404A, 404B, 404C may be utilized by the aforementioned source address range mechanism, while the short-term buffer 406 may be utilized by the aforementioned link protection bot mechanism.

It should also be noted that in addition to the various thresholds either being dynamic or static, each can also be learned via one or more machine learning models. Specifically, a threshold machine learning model may be trained to determine an optimum threshold for a particular click or set of clicks. Specifically, the threshold machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbors, decision trees, and hidden Markov models.

In an example embodiment, a machine learning algorithm used to train the threshold machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation and the weighted sum operation is used by the loss function.

Training data may include historical click information and corresponding labels indicating thresholds that "worked" to detect whether a click is from a bot. This information may be used to train the threshold machine learning model by using the machine learning algorithm to help identify features of clicks or users that indicate an optimal threshold. For example, links for one type of industry's links may be interacted with differently than links for another type of industry's links. From this training data, the machine learning algorithm trains the threshold machine learning model to learn how to identify such features that influence the optimal threshold.

In some example embodiments, the training of the threshold machine learning model may take place as a dedicated training phase. In other example embodiments, the modularization machine learning model may be retrained dynamically at runtime based on, for example, developer or user feedback.

It should be noted that the threshold machine learning model may form the basis for any number of different models to predict the different thresholds described above. For example, one model may be trained to predict the link protection threshold and another model may be trained to predict the click number threshold.

Figure 5:
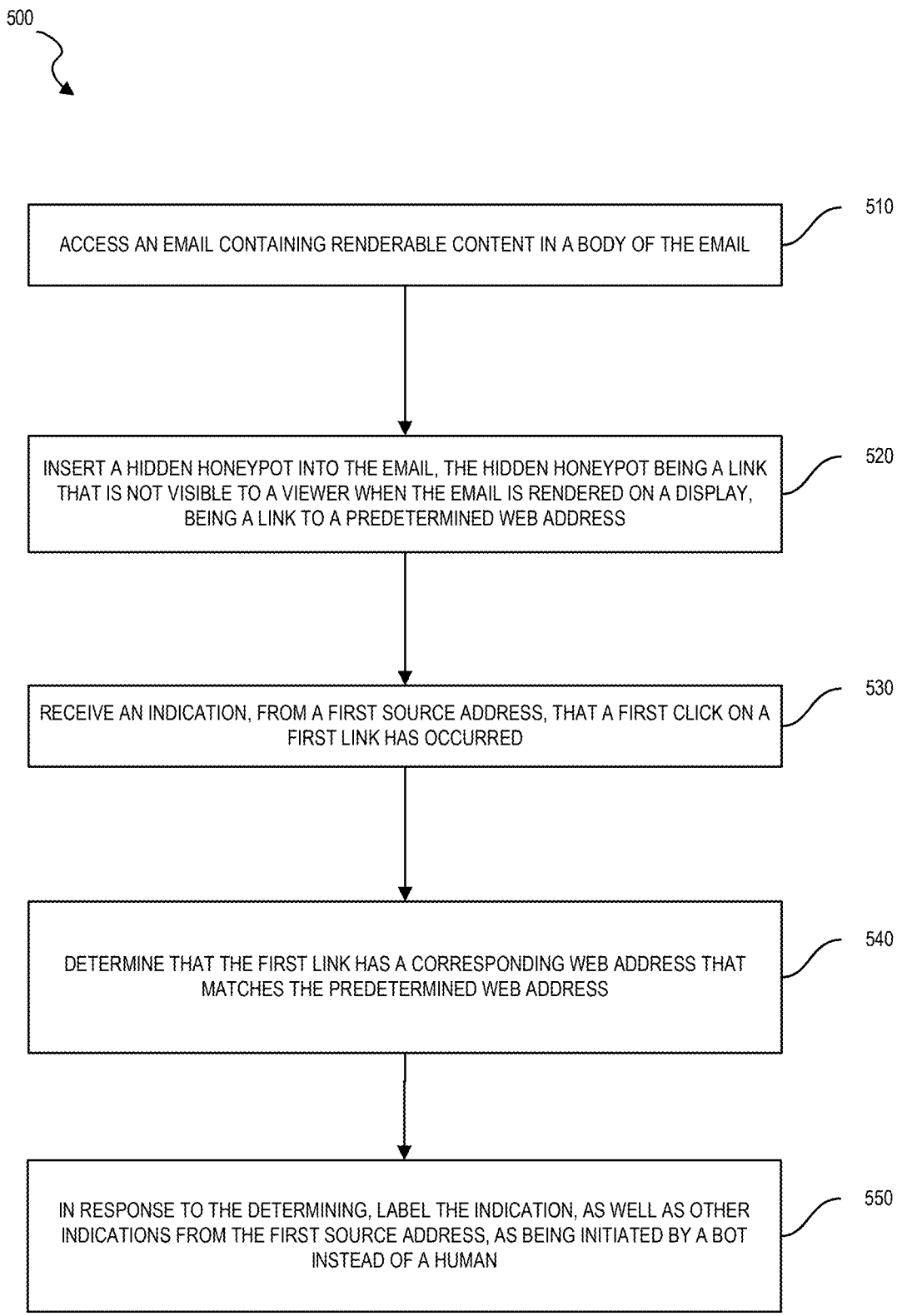
FIG. 5 is a flowchart of an example method for detecting whether a click on a link in an email originates from a bot or a human, in accordance with an example embodiment.

FIG. 5 is a flowchart of an example method 500 for detecting whether a click on a link in an email originates from a bot or a human, in accordance with an example embodiment. At step 510, an email containing renderable content in a body of the email is accessed. At step 520, a hidden honeypot is inserted into the email, the hidden honeypot being a link that is not visible to a viewer when the email is rendered on a display, being a link to a predetermined web address. At step 530, an indication is received, from a first source address, that a first click on a first link has occurred. At step 540, it is determined that the first link has a corresponding web address that matches the predetermined web address. At step 550, in response to the determining, the indication, as well as other indications from the first source address, are labeled as being initiated by a bot instead of a human.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing an email containing renderable content in a body of the email; inserting a hidden honeypot into the email, the hidden honeypot being a link that is not visible to a viewer when the email is rendered on a display, being a link to a predetermined web address; receiving an indication, from a first source address, that a first click on a first link has occurred; determining that the first link has a corresponding web address that matches the predetermined web address; and in response to the determining, labeling the indication, as well as other indications from the first source address, as being initiated by a bot instead of a human.

In Example 2, the subject matter of Example 1 comprises, wherein the hidden honeypot is inserted into a field of a header of the email.

In Example 3, the subject matter of Examples 1-2 comprises, wherein the hidden honeypot is inserted into a body of the email as an element that is not rendered on the display when the email is rendered on the display.

In Example 4, the subject matter of Examples 1-3 comprises, wherein the hidden honeypot is inserted into a body of the email as an element that is rendered but is not visible on the display when the email is rendered on the display.

In Example 5, the subject matter of Examples 1-4 comprises, wherein all indications from the first source address are labeled as being initiated by a bot.

In Example 6, the subject matter of Examples 1-5 comprises, wherein the operations further comprise: passing the labeled indication to an interaction tracking component, the interaction tracking component generating a report based on the labeled indication.

In Example 7, the subject matter of Example 6 comprises, wherein the indication is placed into a buffer along with other indications received during a delay time period, and wherein the determining operation is performed on each indication in the buffer prior to passing any of the indications in the buffer to the interaction tracking component.

In Example 8, the subject matter of Example 7 comprises, wherein the operations further comprise: determining whether the indication was one of more than a preset number of interactions received from source addresses in a preset source address range during a preset period of time; and in response to a determination that the indication was one of more than the preset number of interactions received from source addresses in the preset source address range during the preset period of time, labeling each of the more than preset number of interactions as being initiated by a bot instead of a human.

In Example 9, the subject matter of Examples 7-8 comprises, wherein the operations further comprise: determining whether the indication was received within a preset period of time from a different source than a second indication of an interaction with the first link; and in response to a determination that the indication was received within the preset period of time from the different source than the second indication of an interaction with the first link, labeling either the indication or the second indication, depending upon which indication was received first, as being initiated by a bot instead of a human.

Example 10 is a method comprising: accessing an email containing renderable content in a body of the email; inserting a hidden honeypot into the email, the hidden honeypot being a link that is not visible to a viewer when the email is rendered on a display, being a link to a predetermined web address; receiving an indication, from a first source address, that a first click on a first link has occurred; determining that the first link has a corresponding web address that matches the predetermined web address; and in response to the determining, labeling the indication, as well as other indications from the first source address, as being initiated by a bot instead of a human.

In Example 11, the subject matter of Example 10 comprises, wherein the hidden honeypot is inserted into a field of a header of the email.

In Example 12, the subject matter of Examples 10-11 comprises, wherein the hidden honeypot is inserted into a body of the email as an element that is not rendered on the display when the email is rendered on the display.

In Example 13, the subject matter of Examples 10-12 comprises, wherein the hidden honeypot is inserted into a body of the email as an element that is rendered but is not visible on the display when the email is rendered on the display.

In Example 14, the subject matter of Examples 10-13 comprises, wherein all indications from the first source address are labeled as being initiated by a bot.

In Example 15, the subject matter of Examples 10-14 comprises, passing the labeled indication to an interaction tracking component, the interaction tracking component generating a report based on the labeled indication.

In Example 16, the subject matter of Example 15 comprises, wherein the indication is placed into a buffer along with other indications received during a delay time period, and wherein the determining is performed on each indication in the buffer prior to passing any of the indications in the buffer to the interaction tracking component.

In Example 17, the subject matter of Example 16 comprises, determining whether the indication was one of more than a preset number of interactions received from source addresses in a preset source address range during a preset period of time; and in response to a determination that the indication was one of more than the preset number of interactions received from source addresses in the preset source address range during the preset period of time, labeling each of the more than preset number of interactions as being initiated by a bot instead of a human.

In Example 18, the subject matter of Examples 16-17 comprises, determining whether the indication was received within a preset period of time from a different source than a second indication of an interaction with the first link; and in response to a determination that the indication was received within the preset period of time from the different source than the second indication of an interaction with the first link, labeling either the indication or the second indication, depending upon which indication was received first, as being initiated by a bot instead of a human.

Example 19 is a non-transitory machine-readable medium storing instructions which, when executed by one or more processors, cause the one or more processors to perform operations comprising: accessing an email containing renderable content in a body of the email; inserting a hidden honeypot into the email, the hidden honeypot being a link that is not visible to a viewer when the email is rendered on a display, being a link to a predetermined web address; receiving an indication, from a first source address, that a first click on a first link has occurred; determining that the first link has a corresponding web address that matches the predetermined web address; and in response to the determining, labeling the indication, as well as other indications from the first source address, as being initiated by a bot instead of a human.

In Example 20, the subject matter of Example 19 comprises, wherein the hidden honeypot is inserted into a field of a header of the email.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 6:
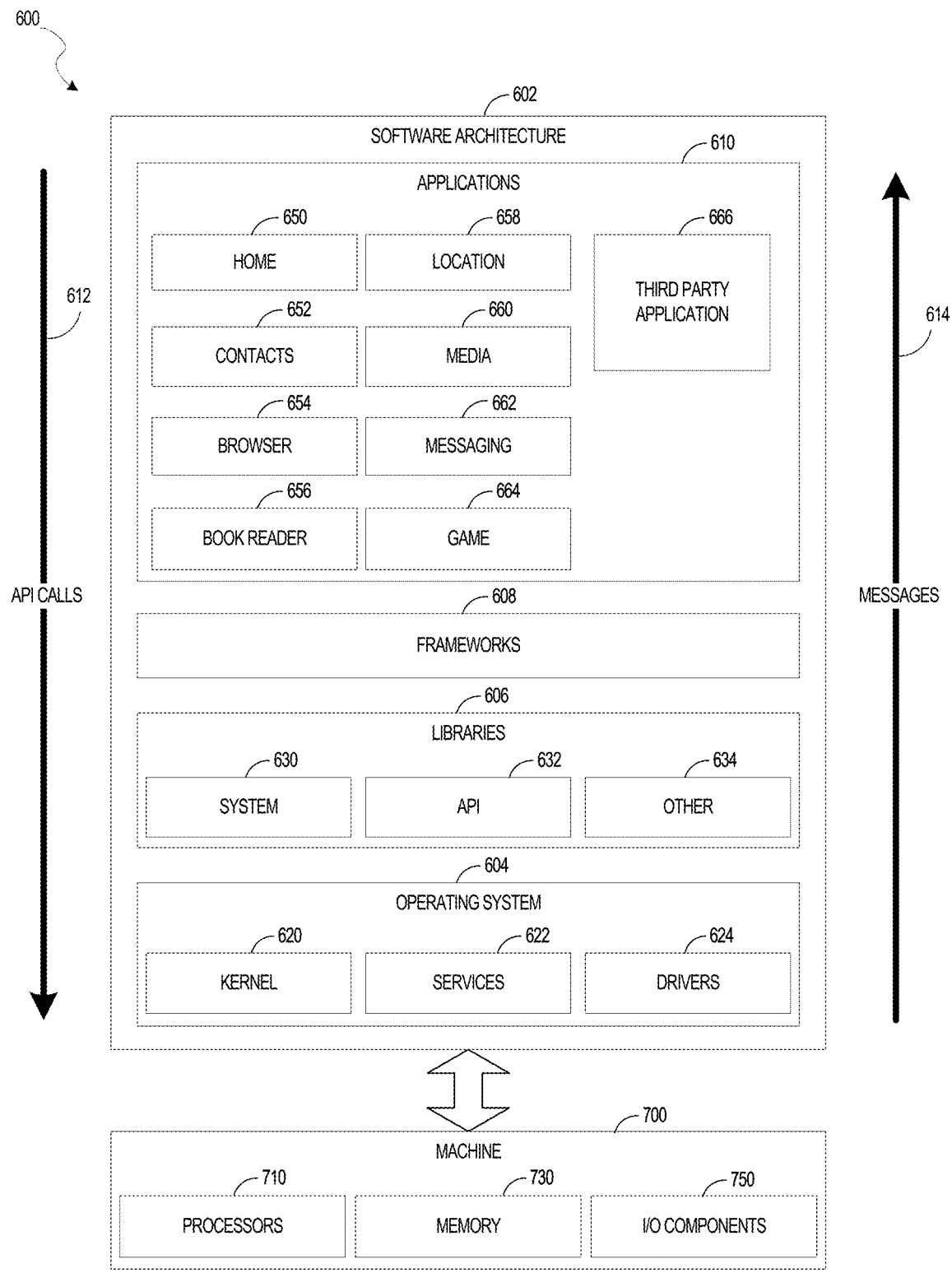
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that comprises processors 710, memory 730, and input/output (I/O) components 750. In this example architecture, the software architecture 602 can be conceptualized as a stack of layers where each layer may provide a particular functionality. For example, the software architecture 602 comprises layers such as an operating system 604, libraries 606, frameworks 608, and applications 610. Operationally, the applications 610 invoke Application Program Interface (API) calls 612 through the software stack and receive messages 614 in response to the API calls 612, consistent with some embodiments.

In various implementations, the operating system 604 manages hardware resources and provides common services. The operating system 604 comprises, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionalities. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and six-dimensional (6D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
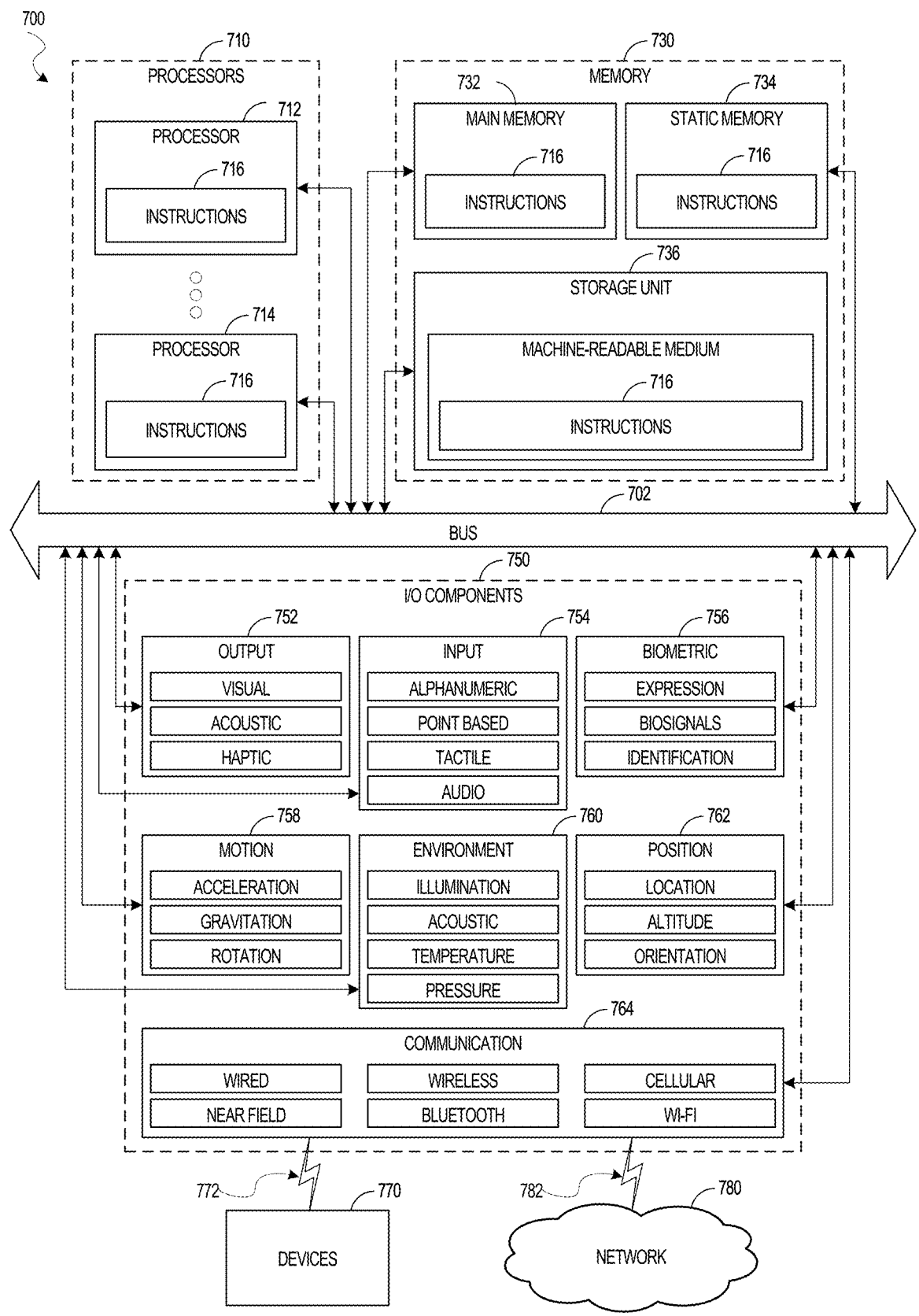
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method of FIG. 4. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via IP geolocation, location via Wi-Fi® signal triangulation, location via detecting an NFC beacon signal that may indicate a particular location, and so forth.

The various memories (e.g., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media,"

"computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol [HTTP]). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing an email containing renderable content in a body of the email;
   inserting a hidden honeypot into the email, the hidden honeypot being a link that is not visible to a viewer when the email is rendered on a display, being a link to a predetermined web address;
   receiving an indication, from a first source address, that a first click on a first link has occurred;
   determining that the first link has a corresponding web address that matches the predetermined web address; and
   in response to the determining, labeling the indication, as well as other indications from the first source address, as being initiated by a bot instead of a human.

2. The system of claim 1, wherein the hidden honeypot is inserted into a field of a header of the email.

3. The system of claim 1, wherein the hidden honeypot is inserted into a body of the email as an element that is not rendered on the display when the email is rendered on the display.

4. The system of claim 1, wherein the hidden honeypot is inserted into a body of the email as an element that is rendered but is not visible on the display when the email is rendered on the display.

5. The system of claim 1, wherein all indications from the first source address are labeled as being initiated by a bot.

6. The system of claim 1, wherein the operations further comprise:
   passing the labeled indication to an interaction tracking component, the interaction tracking component generating a report based on the labeled indication.

7. The system of claim 6, wherein the indication is placed into a buffer along with other indications received during a delay time period; and
   wherein the determining operation is performed on each indication in the buffer prior to passing any of the indications in the buffer to the interaction tracking component.

8. The system of claim 7, wherein the operations further comprise:
   determining whether the indication was one of more than a preset number of interactions received from source addresses in a preset source address range during a preset period of time; and
   in response to a determination that the indication was one of more than the preset number of interactions received from source addresses in the preset source address range during the preset period of time, labeling each of the more than preset number of interactions as being initiated by a bot instead of a human.

9. The system of claim 7, wherein the operations further comprise:
   determining whether the indication was received within a preset period of time from a different source than a second indication of an interaction with the first link; and
   in response to a determination that the indication was received within the preset period of time from the different source than the second indication of an interaction with the first link, labeling either the indication or the second indication, depending upon which indication was received first, as being initiated by a bot instead of a human.

10. A method comprising:
accessing an email containing renderable content in a body of the email;
inserting a hidden honeypot into the email, the hidden honeypot being a link that is not visible to a viewer when the email is rendered on a display, being a link to a predetermined web address;
receiving an indication, from a first source address, that a first click on a first link has occurred;
determining that the first link has a corresponding web address that matches the predetermined web address; and
in response to the determining, labeling the indication, as well as other indications from the first source address, as being initiated by a bot instead of a human.

11. The method of claim 10, wherein the hidden honeypot is inserted into a field of a header of the email.

12. The method of claim 10, wherein the hidden honeypot is inserted into a body of the email as an element that is not rendered on the display when the email is rendered on the display.

13. The method of claim 10, wherein the hidden honeypot is inserted into a body of the email as an element that is rendered but is not visible on the display when the email is rendered on the display.

14. The method of claim 10, wherein all indications from the first source address are labeled as being initiated by a bot.

15. The method of claim 10, further comprising:
passing the labeled indication to an interaction tracking component, the interaction tracking component generating a report based on the labeled indication.

16. The method of claim 15, wherein the indication is placed into a buffer along with other indications received during a delay time period; and
wherein the determining is performed on each indication in the buffer prior to passing any of the indications in the buffer to the interaction tracking component.

17. The method of claim 16, further comprising:
determining whether the indication was one of more than a preset number of interactions received from source addresses in a preset source address range during a preset period of time; and
in response to a determination that the indication was one of more than the preset number of interactions received from source addresses in the preset source address range during the preset period of time, labeling each of the more than preset number of interactions as being initiated by a bot instead of a human.

18. The method of claim 16, further comprising:
determining whether the indication was received within a preset period of time from a different source than a second indication of an interaction with the first link; and
in response to a determination that the indication was received within the preset period of time from the different source than the second indication of an interaction with the first link, labeling either the indication or the second indication, depending upon which indication was received first, as being initiated by a bot instead of a human.

19. A non-transitory machine-readable medium storing instructions which, when executed by one or more processors, cause the one or more processors to perform operations comprising:
accessing an email containing renderable content in a body of the email;
inserting a hidden honeypot into the email, the hidden honeypot being a link that is not visible to a viewer when the email is rendered on a display, being a link to a predetermined web address;
receiving an indication, from a first source address, that a first click on a first link has occurred;
determining that the first link has a corresponding web address that matches the predetermined web address; and
in response to the determining, labeling the indication, as well as other indications from the first source address, as being initiated by a bot instead of a human.

20. The non-transitory machine-readable medium of claim 19, wherein the hidden honeypot is inserted into a field of a header of the email.

* * * * *